US012657888B2

(12) United States Patent (10) Patent No.: US 12,657,888 B2
Barkan et al. (45) Date of Patent: Jun. 16, 2026

(54) SYNTHETIC MULTI-MODAL DATA GENERATION FROM UNI-MODAL DATASETS

(71) Applicant: International Business Machines Corporation, Armonk, NY (US)

(72) Inventors: Ella Barkan, Haifa (IL); Simona Rabinovici-Cohen, Haifa (IL); Michal Flato, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 18/454,140

(22) Filed: Aug. 23, 2023

(65) Prior Publication Data

US 2025/0069376 A1 Feb. 27, 2025

(51) Int. Cl.
*G06V 10/776* (2022.01)
*G06V 10/762* (2022.01)
*G06V 10/774* (2022.01)

(52) U.S. Cl.
CPC .......... *G06V 10/776* (2022.01); *G06V 10/762* (2022.01); *G06V 10/774* (2022.01)

(58) Field of Classification Search
USPC ....................................................... 382/159
See application file for complete search history.

(56) References Cited

U.S. PATENT DOCUMENTS

| | | | | |
|---|---|---|---|---|
| 11,670,417 | B2* | 6/2023 | Banerjee | G16H 50/20 |
| | | | | 702/19 |
| 12,087,446 | B2* | 9/2024 | Kollada | G16H 50/20 |
| 2020/0019769 | A1* | 1/2020 | Leibovitz | G06V 30/40 |
| 2020/0311467 | A1* | 10/2020 | Srivastava | G06N 3/09 |
| 2021/0192290 | A1* | 6/2021 | Rothberg | G06N 3/0895 |
| 2022/0335258 | A1* | 10/2022 | Raventos | G06N 3/0895 |
| 2022/0392637 | A1 | 12/2022 | Kollada | |
| 2023/0105659 | A1* | 4/2023 | Banerjee | G06V 10/7715 |
| | | | | 702/19 |
| 2024/0312193 | A1* | 9/2024 | Cheng | G06V 10/82 |
| 2024/0331137 | A1* | 10/2024 | Heng | G06V 10/764 |
| 2025/0069376 | A1* | 2/2025 | Barkan | G06V 10/776 |
| 2025/0139957 | A1* | 5/2025 | Yuan | G06F 40/20 |
| 2025/0173618 | A1* | 5/2025 | Cresswell | G06N 3/08 |

OTHER PUBLICATIONS

Abufadda et al., "A Survey of Synthetic Data Generation for Machine Learning", 2021 22nd International Arab Conference on Information Technology, 1 page, <https://ieeexplore.ieee.org/stamp/stamp.jsp?tp=&arnumber=9677302>.

(Continued)

*Primary Examiner* — Ishrat I Sherali
(74) *Attorney, Agent, or Firm* — Stephen R. Yoder

(57) ABSTRACT

A processor may receive one or more datasets. The one or more datasets may include tabular data and imaging data. The processor may generate image embeddings for each of the one or more datasets. Each of the one or more datasets may include respective labels for each of the tabular data and imaging data of the one or more datasets. The processor may stratify the one or more datasets based on the respective labels.

15 Claims, 5 Drawing Sheets

(56) References Cited

OTHER PUBLICATIONS

Bauer et al., "Generation of annotated multimodal ground truth datasets for abdominal medical image registration", Published online: May 2, 2021, 9 pages, <https://link.springer.com/article/10.1007/s11548-021-02372-7>.

Biswal et al., "EMIXER: End-to-end Multimodal X-ray Generation via Self-supervision", © 2022, 28 pages, <https://proceedings.mlr.press/v182/biswal22a.html>.

Du et al., "Multi-view Adversarially Learned Inference for Cross-domain Joint Distribution Matching", © 2018 Association for Computing Machinery, 10 pages, <https://dl.acm.org/doi/pdf/10.1145/3219819.3219957>.

Goncalves et al., "Generation and evaluation of synthetic patient data", © The Author(s). 2020, 40 pages, <https://bmcmedresmethodol.biomedcentral.com/articles/10.1186/s12874-020-00977-1>.

Ito et al., "The Effects of Unimodal Representation Choices on Multimodal Learning", Downloaded Jul. 6, 2023, 8 pages, <https://aclanthology.org/L18-1334/>.

Lipkova et al., "Artificial intelligence for multimodal data integration in oncology", Oct. 10, 2022, 16 pages, <https://www.sciencedirect.com/science/article/pii/S153561082200441X>.

Shamsuddin et al., "Virtual Patient Model: An Approach for Generating Synthetic Healthcare Time Series Data", 2018 IEEE International Conference on Healthcare Informatics, 1 page, <https://ieeexplore.ieee.org/document/8419364>.

Weldon et al., "Generation of Synthetic Electronic Health Records Using a Federated GAN", arXiv:2109.02543v1 [cs.LG] Sep. 6, 2021, 10 pages, <https://arxiv.org/abs/2109.02543>.

* cited by examiner

100

Computing System
101

Processor Set 110

Processing Circuitry
120

Cache
121

Communicating Fabric
111

Volatile Memory
112

Persistent Storage 113

Operating System
122

Application
150

Peripheral Device Set 114

UI Device Set
123

Storage
124

IoT Sensor Set
125

Network Module 115

350

SYNTHETIC MULTI-MODAL DATA GENERATION FROM UNI-MODAL DATASETS

BACKGROUND

The present disclosure relates generally to the field of artificial intelligence (AI) model training, and more specifically to generating synthetic multi-modal data for AI model training and usage.

Currently, large multi-modal datasets are important for developing accurate and robust AI models in the healthcare area. Especially for the development of Foundation Models where large datasets are required. However, limitations in the availability of such datasets are mainly due to data privacy restrictions and regulatory requirements, e.g., coordination between different data management systems like electronic health record (EHR) systems and picture archiving and communication (PACS) systems. Accordingly, there is a need for a solution for the synthesis of the robust multi-modal datasets.

SUMMARY

Embodiments of the present disclosure include a method, computer program product, and system for generating synthetic multi-modal data from uni-modal datasets. A processor may receive one or more datasets. The one or more datasets may include tabular data and imaging data. The processor may generate image embeddings for each of the one or more datasets. Each of the one or more datasets may include respective labels for each of the tabular data and imaging data of the one or more datasets. The processor may stratify the one or more datasets based on the respective labels.

In some embodiments, stratifying the one or more datasets may include clustering the tabular data and imaging data of the one or more datasets based on the stratifying.

In some embodiments, the processor may combine two or more clusters of the tabular data and imaging data of the one or more datasets, and the processor may generate a multimodal dataset. The multi-modal dataset may include the combination of the two or more clusters.

In some embodiments, the processor may validate the multi-modal dataset.

In some embodiments, the processor may generate one or more subsets of the multi-modal dataset, and the processor may train a model based on one of the one or more subsets.

In some embodiments, the processor may evaluate the model based on known evaluation metrics. The known evaluation metrics may be associated with the respective labels.

In some embodiments, the processor may select a subset of the one or more subsets of the multi-modal dataset. The subset of the one or more subsets of the multi-modal dataset may be a subset with a highest evaluation score. The processor may utilize the subset with the highest evaluation score as the multi-modal dataset, and the processor may apply the multi-modal dataset to a real-world scenario.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
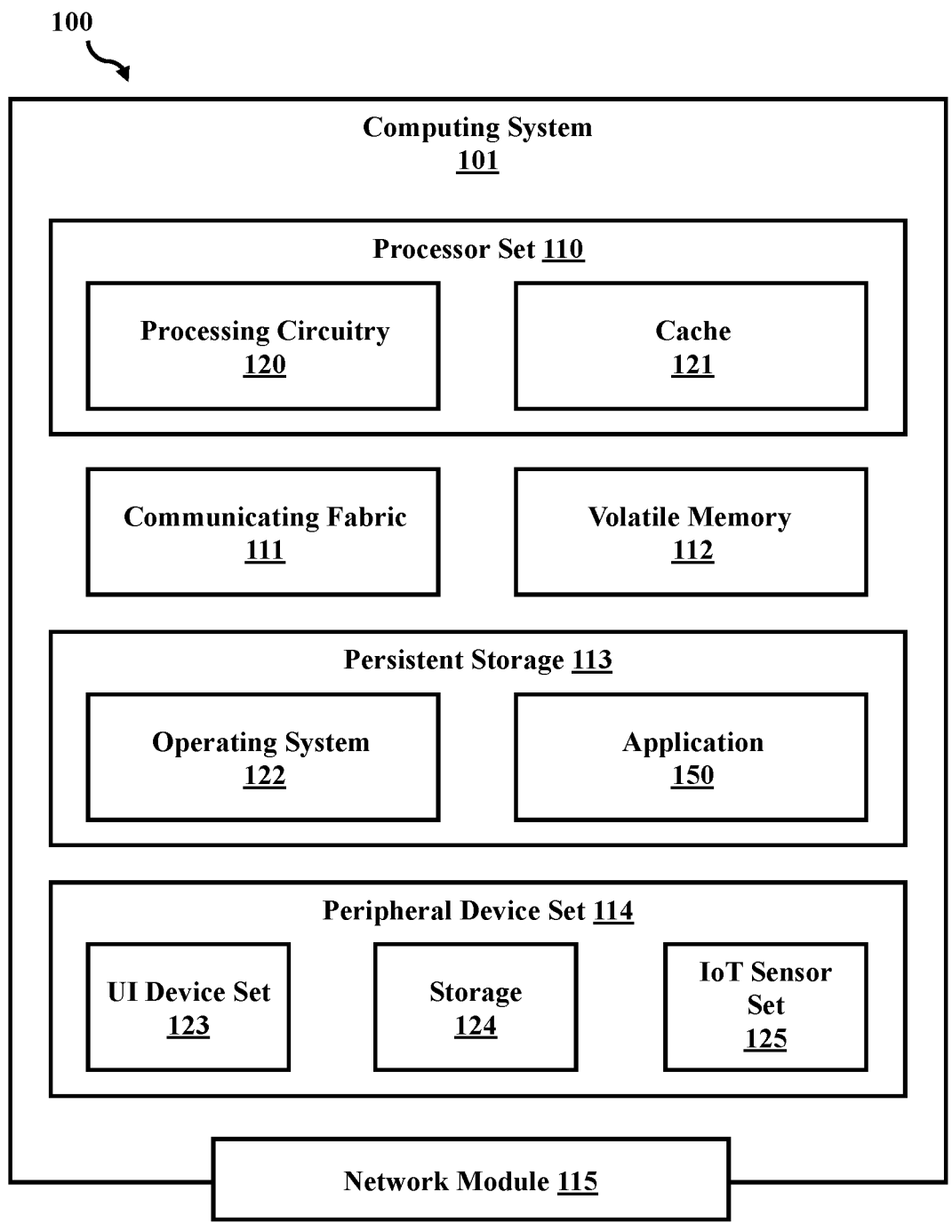
FIG. 1 depicts a block diagram illustrating an embodiment of a computer system and the components thereof, upon which embodiments described herein may be implemented in accordance with the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of artificial intelligence (AI) model training, and more specifically to generating synthetic multi-modal data for AI model training and usage. While the present disclosure is not necessarily limited to such applications, various aspects of the disclosure may be appreciated through a discussion of various examples using this context.

Currently, large multi-modal datasets are important for developing accurate and robust AI models in the healthcare area. Especially for the development of Foundation Models where large datasets are required. However, limitations in the availability of such datasets are mainly due to data privacy restrictions and regulatory requirements, e.g., coordination between different data management systems like electronic health record (EHR) systems and picture archiving and communication (PACS) systems. Accordingly, there is a need for a solution for the synthesis of the robust multi-modal datasets.

Such a solution is discussed throughout this disclosure, and such a solution can greatly improve the speed and efficiency of AI model training and usage, especially in the field/endeavor of cancer biomarker projects that require a large multi-modal set to be utilized efficiently.

The proposed solution can, in some embodiments, generate synthetic multi-modal datasets using real-world uni-modal datasets. In some embodiments, the real-world uni-modal datasets may be patient-disjointed real-world uni-modal datasets. As an example, let's consider data domains presented by several data modalities, which can be, but not limited to:

a Domain of Movies, which can be made up of: Video+Audio+Textual transcription; or a Domain of Healthcare, which can be made up of: Radiological Images+Clinical Tabular Data+Histopathological images.

In such domains, the availability of two types of datasets that manage real-world data, and have the same type of labels (e.g., same scene tagging in the video, tagging of fractures in the images, etc.) is assumed. For instance, it is assumed that:

There is a First Type (of dataset): Small multi-modal dataset where each sample is presented by all modalities (e.g., Video+Audio+Textual transcription for each sample);

There is a Second Type (of dataset): List of uni-modal datasets, with each dataset representing its own modality (e.g., dataset of Video, dataset of Audio and dataset of Textual transcriptions); and The samples in all presented datasets (multi-modal and uni-modal) are not overlapping (i.e., the datasets are disjointed).

With such assumptions, synthetic combinations of the samples can be generated from the real-world uni-modal datasets using unsupervised techniques of data stratification, clustering, and aggregation. The generated synthetic combinations can then be further validated by using them to train a multi-modal model and evaluate it on the original small multi-modal dataset.

Concisely, disclosed throughout this disclosure is a solution that proposes a new method, system, and computer-program product for the generation of the synthetic multi-modal dataset using real-world uni-modal datasets. The solution assumes the availability of disjointed datasets (with different samples) labeled with the same type of label (e.g., one small multi-modal dataset with label(s), and several uni-modal datasets with the same type of label(s)).

The solution then generates synthetic combinations of samples (e.g., patients/users) from the uni-modal datasets using unsupervised techniques of data stratification, clustering, and aggregation, and the generated synthetic combinations are further validated using them to train a multi-modal model and evaluate it on the original small multi-modal dataset.

Before turning to the FIGS. it is noted that various aspects of the present disclosure are described by narrative text, flowcharts, block diagrams of computer systems and/or block diagrams of the machine logic included in computer program product (CPP) embodiments. With respect to any flowcharts (depending upon the technology involved) the operations can be performed in a different order than what is shown in the flowchart. For example, two operations shown in successive flowchart blocks may be performed in reverse order, as a single integrated step, concurrently, or in a manner at least partially overlapping in time. A computer program product embodiment ("CPP embodiment") is a term used in the present disclosure that may describe any set of one or more storage media (or "mediums") collectively included in a set of one or more storage devices. The storage media may collectively include machine readable code corresponding to instructions and/or data for performing computer operations. A "storage device" may refer to any tangible hardware or device that can retain and store instructions for use by a computer processor. Without limitation, the computer readable storage medium may include an electronic storage medium, a magnetic storage medium, an optical storage medium, an electromagnetic storage medium, a semiconductor storage medium, a mechanical storage medium, and/or any combination thereof. Some known types of storage devices that include mediums referenced herein may include a diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination thereof. A computer-readable storage medium should not be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As understood by those skilled in the art, data is typically moved at some occasional points in time during normal operations of a storage device, such as during access, de-fragmentation or garbage collection, but this does not render the storage device as transitory because the data is not transitory while it is stored.

Referring now to FIG. 1, illustrated is a block diagram describing an embodiment of a computing system 101 within in a computing environment, which may be a simplified example of a computing device (i.e., a physical bare metal system and/or a virtual system) capable of performing the computing operations described herein. Computing system 101 may be representative of the one or more computing systems or devices implemented in accordance with the embodiments of the present disclosure and further described below in detail. It should be appreciated that FIG. 1 provides only an illustration of one implementation of a computing system 101 and does not imply any limitations regarding the environments in which different embodiments may be implemented. In general, the components illustrated in FIG. 1 may be representative of an electronic device, either physical or virtualized, capable of executing machine-readable program instructions.

Embodiments of computing system 101 may take the form of a desktop computer, laptop computer, tablet computer, smart phone, smart watch or other wearable computer, mainframe computer, server, quantum computer, a non-conventional computer system such as an autonomous vehicle or home appliance, or any other form of computer or mobile device now known or to be developed in the future that is capable of running a program 150, accessing a network 102 or querying a database, such as remote database 130. Performance of a computer-implemented method executed by a computing system 101 may be distributed among multiple computers and/or between multiple locations. Computing system 101 may be located as part of a cloud network, even though it is not shown within a cloud in FIGS. 1-2. Moreover, computing system 101 is not required to be in a cloud network except to any extent as may be affirmatively indicated.

Processor set 110 includes one, or more, computer processors of any type now known or to be developed in the future. Processing circuitry 120 may be distributed over multiple packages. For example, multiple, coordinated integrated circuit chips. Processing circuitry 120 may implement multiple processor threads and/or multiple processor cores. Cache 121 may refer to memory that is located on the processor chip package(s) and/or may be used for data or code that can be made available for rapid access by the threads or cores running on processor set 110. Cache 121 memories can be organized into multiple levels depending upon relative proximity to the processing circuitry 120. Alternatively, some, or all of cache 121 of processor set 110 may be located "off chip." In some computing environments, processor set 110 may be designed for working with qubits and performing quantum computing.

Computer readable program instructions can be loaded onto computing system 101 to cause a series of operational steps to be performed by processor set 110 of computing system 101 and thereby implement a computer-implemented method. Execution of the instructions can instantiate the methods specified in flowcharts and/or narrative descriptions of computer-implemented methods included in this specification (collectively referred to as "the inventive methods"). The computer readable program instructions can be stored in various types of computer readable storage media, such as cache 121 and the other storage media discussed herein. The program instructions, and associated data, can be accessed by processor set 110 to control and direct performance of the inventive methods. In computing environments of FIGS. 1-2, at least some of the instructions for performing the inventive methods may be stored in persistent storage 113, volatile memory 112, and/or cache 121, as application (s) 150 comprising one or more running processes, services, programs and installed components thereof. For example, program instructions, processes, services and installed components thereof may include the components and/or sub-components of the system 300 as shown in FIG. 3.

Communication fabric 111 may refer to signal conduction paths that may allow the various components of computing system 101 to communicate with each other. For example, communications fabric 111 can provide for electronic communication among the processor set 110, volatile memory 112, persistent storage 113, peripheral device set 114 and/or network module 115. Communication fabric 111 can be made of switches and/or electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 may refer to any type of volatile memory now known or to be developed in the future, and may be characterized by random access, but this is not required unless affirmatively indicated. Examples include dynamic type random access memory (RAM) or static type RAM. In computing system 101, the volatile memory 112 is located in a single package and can be internal to computing system 101, but, alternatively or additionally, the volatile memory 112 may be distributed over multiple packages and/or located externally with respect to computing system 101. Application 150, along with any program(s), processes, services, and installed components thereof, described herein, may be stored in volatile memory 112 and/or persistent storage 113 for execution and/or access by one or more of the respective processor sets 110 of the computing system 101.

Persistent storage 113 can be any form of non-volatile storage for computers that may be currently known or developed in the future. The non-volatility of this storage means that the stored data may be maintained regardless of whether power is being supplied to computing system 101 and/or directly to persistent storage 113. Persistent storage 113 may be a read only memory (ROM), however, at least a portion of the persistent storage 113 may allow writing of data, deletion of data and/or re-writing of data. Some forms of persistent storage 113 may include magnetic disks, solid-state storage devices, hard drives, flash-based memory, erasable read-only memories (EPROM) and semi-conductor storage devices. Operating system 122 may take several forms, such as various known proprietary operating systems or open-source Portable Operating System Interface type operating systems that employ a kernel.

Peripheral device set 114 includes one or more peripheral devices connected to computing system 101. For example, via an input/output (I/O interface). Data communication connections between the peripheral devices and the other components of computing system 101 may be implemented using various methods. For example, through connections using Bluetooth, Near-Field Communication (NFC), wired connections or cables (such as universal serial bus (USB) type cables), insertion type connections (for example, secure digital (SD) card), connections made though local area communication networks and/or wide area networks such as the internet. In various embodiments, UI device set 123 may include components such as a display screen, speaker, microphone, wearable devices (such as goggles, headsets and smart watches), keyboard, mouse, printer, touchpad, game controllers, and haptic feedback devices. Storage 124 can include external storage, such as an external hard drive, or insertable storage, such as an SD card. Storage 124 may be persistent and/or volatile. In some embodiments, storage 124 may take the form of a quantum computing storage device for storing data in the form of qubits. In some embodiments, networks of computing systems 101 may utilize clustered computing and components acting as a single pool of seamless resources when accessed through a network by one or more computing systems 101. For example, a storage area network (SAN) that is shared by multiple, geographically distributed computer systems 101 or network-attached storage (NAS) applications. IoT sensor set 125 can be made up of sensors that can be used in Internet-of-Things applications. For example, a sensor may be a temperature sensor, motion sensor, infrared sensor or any other type of known sensor type.

Network module 115 may include a collection of computer software, hardware, and/or firmware that allows computing system 101 to communicate with other computer systems through a network 102, such as a LAN or WAN. Network module 115 may include hardware, such as modems or Wi-Fi signal transceivers, software for packetizing and/or de-packetizing data for communication network transmission, and/or web browser software for communicating data over the network. In some embodiments, network control functions and network forwarding functions of network module 115 are performed on the same physical hardware device. In other embodiments (for example, embodiments that utilize software-defined networking (SDN)), the control functions and the forwarding functions of network module 115 can be performed on physically separate devices, such that the control functions manage several different network hardware devices. Computer readable program instructions for performing the inventive methods can typically be downloaded to computing system 101 from an external computer or external storage device through a network adapter card or network interface included in network module 115.

Figure 2:
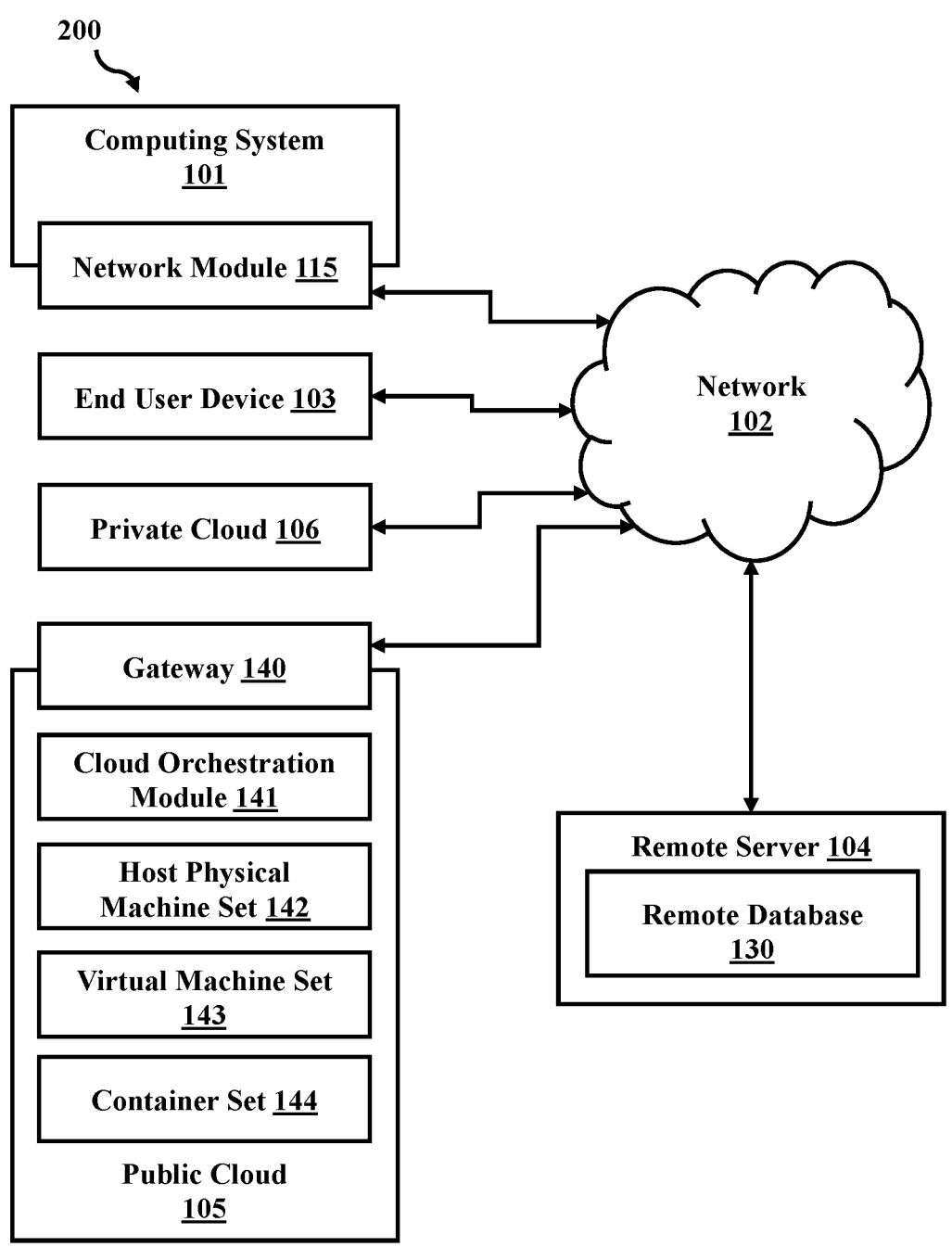
FIG. 2 depicts a block diagram illustrating an extension of the computing system environment of FIG. 1, wherein the computer systems are configured to operate in a network environment (including a cloud environment), and perform methods described herein in accordance with the present disclosure.

Continuing, FIG. 2 depicts a computing environment 200 which may be an extension of the computing environment 100 of FIG. 1, operating as part of a network. In addition to computing system 101, computing environment 200 can include a network 102 such as a wide area network (WAN) (or another type of computer network) connecting computing system 101 to an end user device (EUD) 103, remote server 104, public cloud 105, and/or private cloud 106. In this embodiment, computing system 101 includes processor set 110 (including processing circuitry 120 and cache 121), communication fabric 111, volatile memory 112, persistent storage 113 (including operating system 122 and program(s) 150, as identified above), peripheral device set 114 (including user interface (UI), device set 123, storage 124, Internet of Things (IoT) sensor set 125), and network module 115. Remote server 104 includes remote database 130. Public cloud 105 includes gateway 140, cloud orchestration module 141, host physical machine set 142, virtual machine set 143, and/or container set 144.

Network 102 may be comprised of wired or wireless connections. For example, connections may be comprised of computer hardware such as copper transmission cables, optical transmission fibers, wireless transmission, routers, firewalls, switches, gateway computers and/or edge servers. Network 102 may be described as any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. Other types of networks that can be used to interconnect the various computer systems 101, end user devices 103, remote servers 104, private cloud 106 and/or public cloud 105 may include Wireless Local Area Networks (WLANs), home area network (HAN), backbone networks (BBN), peer to peer networks (P2P), campus networks, enterprise networks, the Internet, single tenant or multi-tenant cloud computing networks, the Public Switched Telephone Network (PSTN), and any other network or network topology known by a person skilled in the art to interconnect computing systems 101.

End user device 103 can include any computer device that can be used and/or controlled by an end user (for example, a customer of an enterprise that operates computing system 101) and may take any of the forms discussed above in connection with computing system 101. EUD 103 may receive helpful and useful data from the operations of computing system 101. For example, in a hypothetical case where computing system 101 is designed to provide a recommendation to an end user, this recommendation may be communicated from network module 115 of computing system 101 through WAN 102 to EUD 103. In this example, EUD 103 can display, or otherwise present, the recommendation to an end user. In some embodiments, EUD 103 may be a client device, such as thin client, thick client, mobile computing device such as a smart phone, mainframe computer, desktop computer and so on.

Remote server 104 may be any computing systems that serves at least some data and/or functionality to computing system 101. Remote server 104 may be controlled and used by the same entity that operates computing system 101. Remote server 104 represents the machine(s) that collect and store helpful and useful data for use by other computers, such as computing system 101. For example, in a hypothetical case where computing system 101 is designed and programmed to provide a recommendation based on historical data, the historical data may be provided to computing system 101 from remote database 130 of remote server 104.

Public cloud 105 may be any computing systems available for use by multiple entities that provide on-demand availability of computer system resources and/or other computer capabilities including data storage (cloud storage) and computing power, without direct active management by the user. The direct and active management of the computing resources of public cloud 105 can be performed by the computer hardware and/or software of cloud orchestration module 141. The computing resources provided by public cloud 105 can be implemented by virtual computing environments that run on various computers making up the computers of host physical machine set 142, and/or the universe of physical computers in and/or available to public cloud 105. The virtual computing environments (VCEs) may take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through network 102.

VCEs can be stored as "images." A new active instance of the VCE can be instantiated from the image. Two types of VCEs may include virtual machines and containers. A container is a VCE that uses operating-system-level virtualization, in which the kernel allows the existence of multiple isolated user-space instances, called containers. These isolated user-space instances may behave as physical computers from the point of view of programs 150 running in them. An application 150 running on an operating system 122 can utilize all resources of that computer, such as connected devices, files and folders, network shares, CPU power, and quantifiable hardware capabilities. Applications 150 running inside a container of container set 144 may only use the contents of the container and devices assigned to the container, a feature which may be referred to as containerization.

Private cloud 106 may be similar to public cloud 105, except that the computing resources may only be available for use by a single enterprise. While private cloud 106 is depicted as being in communication with network 102 (such as the Internet), in other embodiments a private cloud 106 may be disconnected from the internet entirely and only accessible through a local/private network. A hybrid cloud may refer to a composition of multiple clouds of different types (for example, private, community or public cloud types), and the plurality of clouds may be implemented or operated by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 may be both part of a larger hybrid cloud environment.

Figure 3A:
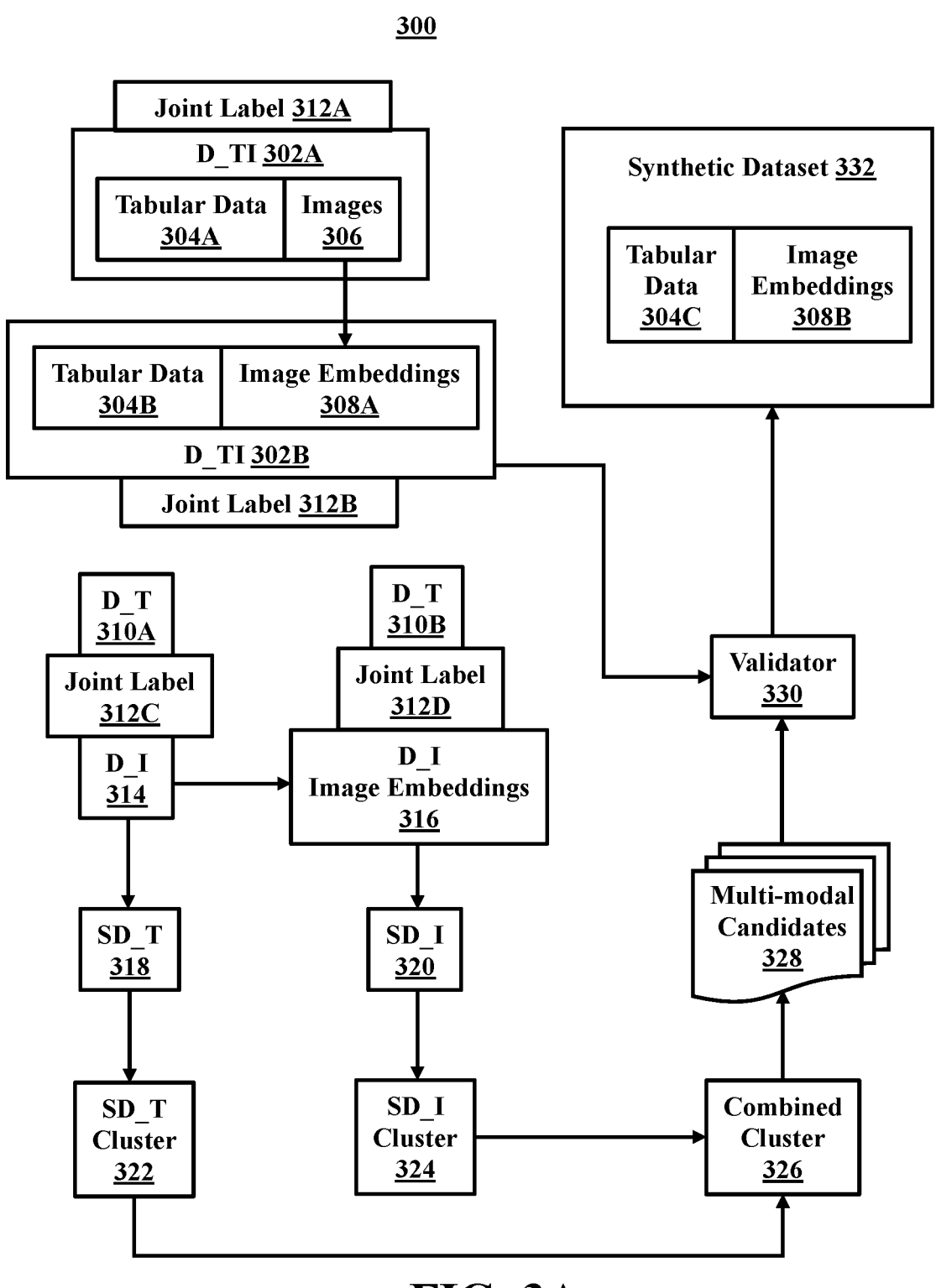
FIG. 3A illustrates a block diagram of an example system for generating synthetic multi-modal data from uni-modal datasets, in accordance with aspects of the present disclosure.

Referring now to FIG. 3A, illustrated is a block diagram of an example system 300 for generating synthetic multi-modal data from uni-modal datasets, in accordance with aspects of the present disclosure.

As depicted, the system 300 includes: D_TI 302A, which includes tabular data 304A and images 306; a joint label 312A; D_TI 302B, which includes tabular data 304B and image embeddings 308A; a joint label 312B; D_T 310A; D_T 310B; a joint label 312C; a joint label 312D; D_I 314; D_I image embeddings 316; SD_T 318; SD_I 320; SD_T cluster 322; SD_I 324; a combined cluster 326; multi-modal candidates 328; a validator 330; and a synthetic dataset 332, which includes tabular data 304C, and image embeddings 308B.

As an example, the system 300 can be described in terms of a use case coming from a healthcare area with only two modalities, but this is not limiting, as it can be generalized to any other domain and any number of modalities coming from this domain. Accordingly, given the following medical dataset and information:

D_TI (e.g., 302A-B), which is a multi-modal dataset of two modalities: tabular [T] (e.g., clinical) data and imaging [I] data;

D_I (e.g., 314, 316) and D_T (e.g., 310A-B), which are two disjointed uni-modal datasets of two modalities presented in D_TI (e.g., 302A-B). It is noted that D_I (e.g., 314, 316) and D_T (e.g., 310A-B) are disjointed to D_TI (e.g., 302A-B) as well;

All datasets have the same joint labels (e.g., 312A-D, recovery is 6 weeks, bedrest for 2 weeks, etc.); and D_I (e.g., 314, 316) and D_T (e.g., 310A-B) might have joint tabular features (not shown) (e.g., user statistics, user metrics, etc.) associated with the joint labels (e.g., 312A-D).

The system 300 generates/creates image embeddings for D_I (e.g., 314, 316) and in D_TI (e.g., 302A-B), sometimes referred to as image embeddings 308A-B, D_I image embeddings 316, and/or collectively image embeddings. Such generation can be done by transformers, autoencoders, inference on pre-trained deep neural network (DNN) model and using its deep layer, etc. These image embeddings will be used for the user/patient presentation of samples from D_I (e.g., 314, 316) and D_TI (e.g., 302A-B) in the next steps of the operations (which may or may not be associated with operations performed in the method 400 of FIG. 4) that are to be performed by the system 300.

In some embodiments, the system 300 stratifies/groups patient/user associated data of D_I (e.g., 314, 316) and D_T (e.g., 310A-B), sometimes referred to as SD_T 318, SD_I 320, and/or stratified data, using the joint labels (e.g., 312A-D) and/or joint set of features (if they are available). In some embodiments, the system 300 stratifies by the joint labels 312A-D. The system 300 may additionally split patients/users into disjointed homogenous groups, with each group being called a "stratum," and which are sometimes referred to as SD_T cluster 322, SD_I cluster 324, and/or stratified groups or clusters, with the same labels (e.g., 312A-D) and same values of joint features.

In some embodiments, for each stratum "S" of the labels (e.g., SD_T 318 and SD_I 320) and joint set of features, it is assumed that:

There are samples from D_I (e.g., 314, 316) and D_T (e.g., 310A-B), in S (e.g., SD_T 318 and SD_I 320). Otherwise, skip S (e.g., stratifying);

There are cluster samples (e.g., SD_T cluster 322, SD_I cluster 324) corresponding to S in D_I (e.g., 314, 316) and D_T (e.g., 310A-B). This operation can be done by one of a known clustering method, such as, but not limited to K-means, Mean-Shift, etc. The label and joint features will be present in samples of both D_I (e.g., 314, 316) and D_T (e.g., 310A-B). A resulting duplication of features will be resolved in the final multi-modal dataset (e.g., synthetic dataset 332 from the multi-modal candidates 328 as will be filtered/validated by the validator 330); and The system 300 will combine clusters (e.g., combined cluster 326) of D_I (e.g., 314, 316) and D_T (e.g., 310A-B) as SD_T cluster 322 and SD_I cluster 324 for the generation of the multi-modal candidates 328, which may be synthetic themselves. This can be done, for example, by one of the following techniques: (1) using all combinations (of the combined cluster 326), e.g., the cartesian product of elements in two matched clusters of SD_T cluster 322 and SD_I cluster 324, (2) sampling from the set of all combinations (of the combined cluster 326), and/or (3) computing the centroid of each cluster of SD_T cluster 322 and SD_I cluster 324 (by taking the average on element values) and combining them into a single multi-modal sample of the multi-modal candidates 328.

In some embodiments, the system 300 validates the generated synthetic multi-modal candidates 328 via the validator 330. In such an embodiment, the validator 330 generates subsets of the multi-modal candidates 328, for example, in one of the following mechanisms (i) backward/forward iterative selection, or (ii) random sampling of the multi-modal candidates 328.

It is noted that for each subset of multi-modal candidates 328, which may include a multi-modal candidate for each strata:

A model is trained using data from a subset; and

The model is evaluated by the validator 330 by inferring on D_TI (e.g., 302A-B) using known evaluation metrics (e.g., area under the roc curve (AUC) with confidence interval).

In some embodiments, using the results of the evaluation selecting the most promising subset of the multi-modal candidates 328, for example, by one of the following options discussed directly above, the validator 330:

Selects multi-modal candidates 328 from the subsets that achieve the highest performance; and Selects multi-modal candidates 328 that appear in at least K1 times in K2-top performing subsets (e.g., $1 \le K1 < K2$).

In some embodiments, after selecting highest performing/most promising candidates, the system 300 utilizing the validator 330 composes validated multi-modal candidates 328 in a multi-modal set of synthetic data of patients/users, e.g., the synthetic dataset 332.

Figure 3B:
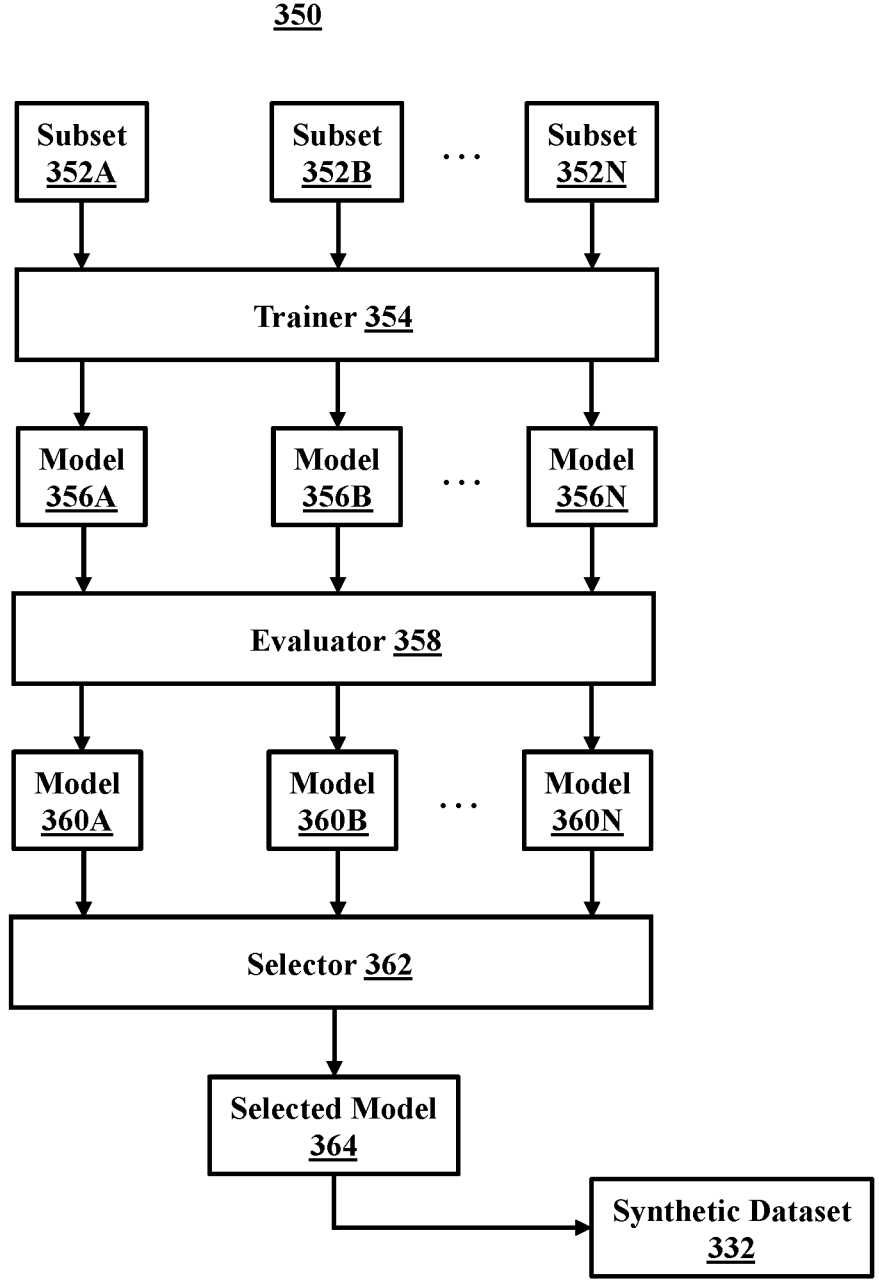
FIG. 3B illustrates a block diagram of an example validation for generating synthetic multi-modal data from uni-modal datasets, in accordance with aspects of the present disclosure.

Referring to FIG. 3B, illustrated is an in-depth block diagram of an example validation 350 for generating synthetic multi-modal data from uni-modal datasets, in accordance with aspects of the present disclosure. In some embodiments, the validation 350 is the same as, or substantially similar to the validation of the validator 330 of system 300 of FIG. 3A.

As depicted, the validation 350 includes subsets 352A-N, a trainer 354, models 356A-N, an evaluator 358, models 360A-N, a selector 362, a selected model 364, and the synthetic dataset 332.

In some embodiments, as depicted, validation 350 includes generating subsets 352A-N of multi-modal candidates (e.g., 328 of FIG. 3A). The subsets 352A-N are then used by the trainer 354 to train a model, or the models 356A-N, that are associated with the subsets 352A-N. The models 356A-N are then evaluated by the evaluator 358, which evaluates and/or ranks the models 356A-N to select the best or most promising models 360A-N. It is noted that the best or most promising models 360A-N can be synthetic multi-modal candidate models that use synthetic data.

In some embodiments, the evaluator 358 runs an inference on a D_TI (e.g., 302A-B of FIG. 3A) and evaluates using a defined/known evaluation metric (e.g., data of hairline fractures, etc.). In some embodiments the selector 362 then selects the best model (e.g., selected model 364) of the models 360A-N based on a best metric value (e.g., model 360A is selected because 90% of data in model 360A includes hairline images and accuracy of included images is high).

In some embodiments, the selected model 364 is then used by the validator 330 to generate or define the synthetic dataset 332. It is noted that the synthetic dataset 332 is a dataset that includes tabular data and image embeddings that are generated from other datasets, where the datasets do not include the particular combination of tabular data and image embeddings as the synthetic dataset 332. In some embodiments, put another way, the selected model 354 does not itself generate the synthetic dataset 332, the synthetic dataset 332 is a subset (from subsets 352A-N) that trained selected model 364.

Figure 4:
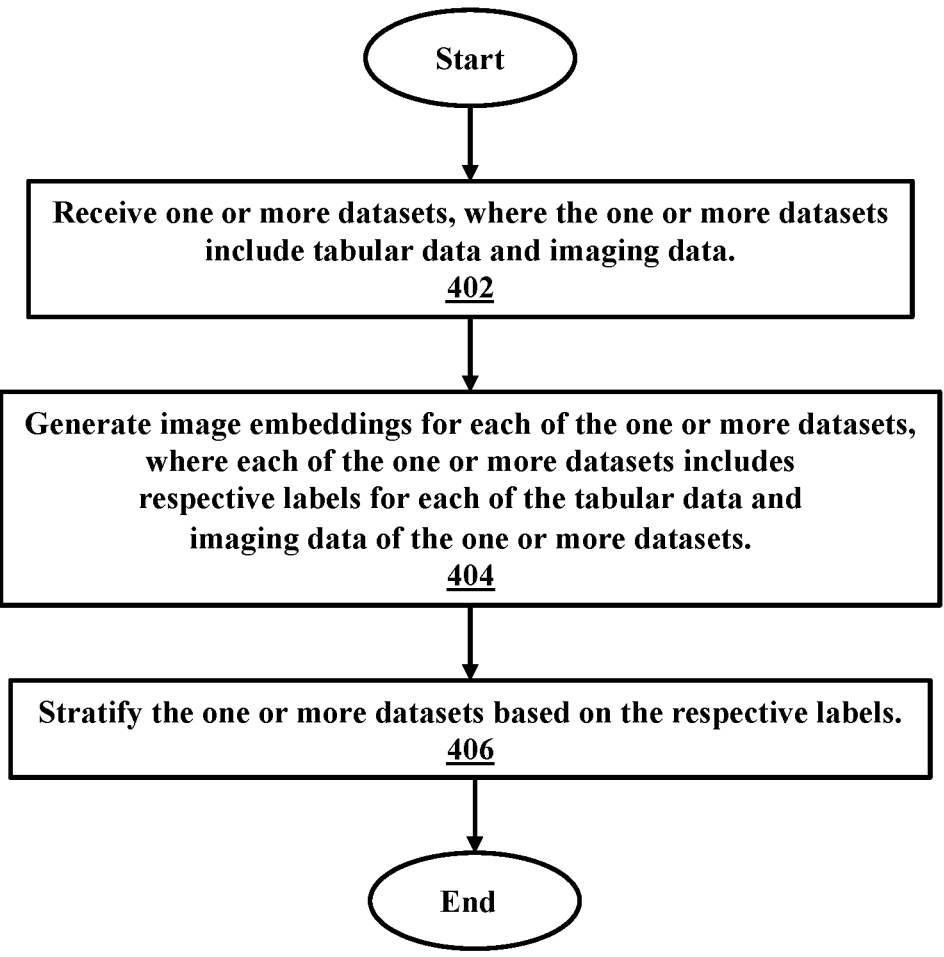
FIG. 4 illustrates a flowchart of an example method for generating synthetic multi-modal data from uni-modal datasets, in accordance with aspects of the present disclosure.

Referring now to FIG. 4, illustrated is a flowchart of an example method 400 for generating synthetic multi-modal data from uni-modal datasets, in accordance with aspects of the present disclosure. In some embodiments, the method 400 may be performed by a processor, such as a processor of the system 300.

In some embodiments, the method 400 begins at operation 402, where a processor receives one or more datasets. The one or more datasets may include tabular data (e.g., category of data, lengths of recovery time, etc.) and imaging data (e.g., x-rays, etc.). In some embodiments, the method 400 proceeds to operation 404, where the processor generates image embeddings for each of the one or more datasets. Each of the one or more datasets may include respective labels for each of the tabular data and imaging data of the one or more datasets. In some embodiments, the method 400 proceeds to operation 406, where the processor stratifies the one or more datasets based on the respective labels. It is noted that stratification can also include any joint features, if they are available. The more elements that are involved in stratification, the better results/outputs provided by the disclosed solution.

In some embodiments, discussed below, there are one or more operations of the method 400 not depicted for the sake of brevity and which are discussed throughout this disclosure. Accordingly, in some embodiments, stratifying the one or more datasets may include clustering the tabular data and imaging data of the one or more datasets based on the stratifying. That is, clustering is applied to each strata (e.g., included in multi-modal candidates 328) after stratification, and clusters of the same strata are combined to cluster a synthetic dataset.

In some embodiments, the processor may further combine two or more clusters of the tabular data and imaging data of the one or more datasets, and the processor may generate a multi-modal dataset. The multi-modal dataset may include the combination of the two or more clusters.

In some embodiments, the processor may validate the multi-modal dataset. In some embodiments, the processor may generate one or more subsets of the multi-modal dataset, and the processor may train a model, or models, based on one of the one or more subsets.

In some embodiments, the processor may evaluate the model, or models, based on known evaluation metrics. The known evaluation metrics may be associated with the tabular data and imaging data.

In some embodiments, the processor may select a subset of the one or more subsets of the multi-modal dataset. The subset of the one or more subsets of the multi-modal dataset may be a subset with a highest evaluation score (e.g., a most promising candidate/highest scoring candidate, etc.). The processor may utilize the subset with the highest evaluation score as the multi-modal dataset, and the processor may apply the multi-modal dataset to a real-world scenario.

As an overall example in regard to the method 400 of FIG. 4, suppose a system (e.g., the system 300 of FIG. 3A ingests a large volume of datasets in regard to medical papers. The system would evaluate the medical papers based on tabular data and images within the medical papers. The system may then tag the tabular data and images (if already not done) of the medical papers. The system may then group tabular data and images of all the medical papers that have the same tags.

The grouped tabular data and images may then be divided into subsets that are then used to train a model, or models, that are to be associated with specific medical data. For the sake of this example, a model that easily identifies carpal tunnel is needed, as such, the system utilizing the method 300, continues to evaluate the model, or models, based on how well the models identified or documented carpal tunnel data or images. When the model reaches a certain threshold, or when a model of the models reaches a certain threshold, in regard to carpal tunnel, the system then selects that model and generates, or defines, a fully synthetic carpal tunnel dataset for use by a user or use on other real-world/physical medical datasets or papers. The fully synthetic carpal tunnel dataset is generated from the piecemeal compilation of the medical papers. It is noted that in some embodiments, particularly in regard to medical information, the data is anonymized to insure no sensitive or personal information is compromised.

It is noted that the descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer system for generating synthetic multi-modal data from uni-modal datasets, the computer system comprising:

one or more processors, one or more computer-readable memories and one or more computer-readable storage media;

program instructions, stored on at least one of the one or more storage media for execution by at least one of the one or more processors via at least one of the one or more memories, to receive a first dataset including only tabular data and a second dataset including only imaging data, datapoints in the datasets being labeled with respective labels, the first and second datasets being disjointed uni-modal datasets of different modalities;

program instructions, stored on at least one of the one or more storage media for execution by at least one of the one or more processors via at least one of the one or more memories, to generate, by a pre-trained deep neural network model via inference using a deep layer, image embeddings for the second dataset such that the imaging data has a same type of labels applied to the tabular data of the first dataset;

program instructions, stored on at least one of the one or more storage media for execution by at least one of the one or more processors via at least one of the one or more memories, to stratify the first dataset and the second dataset, including the image embeddings, into a plurality of clusters based on the respective labels, each cluster including datapoints having common respective labels;

program instructions, stored on at least one of the one or more storage media for execution by at least one of the one or more processors via at least one of the one or more memories, to create a set of synthetic multi-modal candidates for a given strata by a process including combining a cluster of tabular data and a cluster of imaging data having image embeddings based on a shared respective label among the clusters to form a first set of multi-modal candidates, the set of synthetic multi-modal candidates including at least the first set of multi-modal candidates; and program instructions, stored on at least one of the one or more storage media for execution by at least one of the one or more processors via at least one of the one or more memories, to select a synthetic multi-modal dataset for use to train real-world, domain-specific models, the selecting based on performance evaluations of the set of synthetic multi-modal candidates.

2. The computer system of claim 1, further comprising:

program instructions, stored on at least one of the one or more storage media for execution by at least one of the one or more processors via at least one of the one or more memories, to validate the synthetic multi-modal dataset.

3. The computer system of claim 2, wherein validating the multi-modal dataset includes:

generating one or more subsets of the synthetic multi-modal dataset; and training a set of multi-modal models based on one of the one or more subsets.

4. The computer system of claim 3, further comprising:

program instructions, stored on at least one of the one or more storage media for execution by at least one of the one or more processors via at least one of the one or more memories, to perform the performance evaluations of the set of synthetic multi-modal candidates by evaluating the trained set of models based on known evaluation metrics, wherein the known evaluation metrics are associated with the respective labels, the performance evaluations made with reference to an original small multi-modal dataset.

5. The computer system of claim 4, wherein selecting the synthetic multi-modal dataset includes:

selecting a subset of the one or more subsets of the multi-modal dataset, wherein the subset of the one or more subsets of the multi-modal dataset is a subset with a highest evaluation score;

utilizing the selected subset as the synthetic multi-modal dataset; and applying the synthetic multi-modal dataset to a real-world scenario.

6. A computer-implemented method for generating synthetic multi-modal data from uni-modal datasets, the method comprising:

receiving a first dataset including only tabular data and a second dataset including only imaging data, datapoints in the datasets being labeled with respective labels, the first and second datasets being disjointed uni-modal datasets of different modalities;

generating, by a pre-trained deep neural network model via inference using a deep layer, image embeddings for the second dataset such that the imaging data has a same type of labels applied to the tabular data of the first dataset;

stratifying the first dataset and the second dataset, including the image embeddings, into a plurality of clusters based on the respective labels, each cluster including datapoints having common respective labels;

creating a set of synthetic multi-modal candidates for a given strata by a process including combining a cluster of tabular data and a cluster of imaging data having image embeddings based on a shared respective label among the clusters to form a first set of multi-modal candidates, the set of synthetic multi-modal candidates including at least the first set of multi-modal candidates; and selecting a synthetic multi-modal dataset for use to train real-world, domain-specific models, the selecting based on performance evaluations of the set of synthetic multi-modal candidates.

7. The method of claim 6, further comprising:

validating, by a validator, the synthetic multi-modal dataset.

8. The method of claim 7, wherein validating the synthetic multi-modal dataset includes:

generating one or more subsets of the synthetic multi-modal dataset; and training a set of multi-modal models based on one of the one or more subsets.

9. The method of claim 8, further comprising:

performing the performance evaluations of the set of synthetic multi-modal candidates by evaluating the trained set of models based on known evaluation metrics, wherein the known evaluation metrics are associated with the respective labels, the performance evaluations made with reference to an original small multi-modal dataset.

10. The method of claim 9, wherein selecting the synthetic multi-modal dataset includes:

selecting a subset of the one or more subsets of the multi-modal dataset, wherein the subset of the one or more subsets of the multi-modal dataset is a subset with a highest evaluation score;

utilizing the selected subset as the synthetic multi-modal dataset; and applying the synthetic multi-modal dataset to a real-world scenario.

11. A computer program product for generating synthetic multi-modal data from uni-modal datasets, the computer program product comprising:

one or more computer-readable storage media;

program instructions, stored on at least one of the one or more storage media, to receive a first dataset including only tabular data and a second dataset including only imaging data, datapoints in the datasets being labeled with respective labels, the first and second datasets being disjointed uni-modal datasets of different modalities;

program instructions, stored on at least one of the one or more storage media, to generate, by a pre-trained deep neural network model via inference using a deep layer, image embeddings for the second dataset such that the imaging data has a same type of labels applied to the tabular data of the first dataset;

program instructions, stored on at least one of the one or more storage media, to stratify the first dataset and the second dataset, including the image embeddings, into a plurality of clusters based on the respective labels, each cluster including datapoints having common respective labels;

program instructions, stored on at least one of the one or more storage media, to create a set of synthetic multi-modal candidates for a given strata by a process including combining a cluster of tabular data and a cluster of imaging data having image embeddings based on a shared respective label among the clusters to form a first set of multi-modal candidates, the set of synthetic multi-modal candidates including at least the first set of multi-modal candidates; and program instructions, stored on at least one of the one or more storage media, to select a synthetic multi-modal dataset for use to train real-world, domain-specific models, the selecting based on performance evaluations of the set of synthetic multi-modal candidates.

12. The computer program product of claim 11, further comprising program instructions, stored on at least one of the one or more storage media, to:

validate the synthetic multi-modal dataset.

13. The computer program product of claim 12, further comprising program instructions, stored on at least one of the one or more storage media, to:

generate one or more subsets of the synthetic multi-modal dataset; and train a set of multi-modal models based on one of the one or more subsets.

14. The computer program product of claim 13, further comprising program instructions, stored on at least one of the one or more storage media, to:

perform the performance evaluations of the set of synthetic multi-modal candidates by evaluating the trained set of models based on known evaluation metrics, wherein the known evaluation metrics are associated with the respective labels, the performance evaluations made with reference to an original small multi-modal dataset;

select a subset of the one or more subsets of the multi-modal dataset, wherein the subset of the one or more subsets of the multi-modal dataset is a subset with a highest evaluation score;

utilize the selected subset as the synthetic multi-modal dataset; and apply the synthetic multi-modal dataset to a real-world scenario.

15. The method of claim 10, wherein the real-world scenario is the evaluation of hairline fractures using a healthcare-specific model.

* * * * *